United States Patent
Sheoran et al.

(10) Patent No.: US 7,927,408 B2
(45) Date of Patent: Apr. 19, 2011

(54) INLET PARTICLE SEPARATOR SYSTEMS AND METHODS

(75) Inventors: Yogendra Y. Sheoran, Scottsdale, AZ (US); Z. Daniel Judd, Phoenix, AZ (US); Morris G. Anderson, Mesa, AZ (US); Robert S. Murray, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 742 days.

(21) Appl. No.: 11/948,278

(22) Filed: Nov. 30, 2007

(65) Prior Publication Data

US 2009/0139398 A1    Jun. 4, 2009

(51) Int. Cl.
*B01D 45/00* (2006.01)

(52) U.S. Cl. .................. 96/397; 55/DIG. 14; 55/385.3; 55/434; 55/306; 96/399

(58) Field of Classification Search ............. 55/DIG. 14, 55/385.3, 306, 392, 399, 413, 418, 423, 424, 55/426, 427, 428, 434, 437, 459.3, 459.5, 55/467; 95/12; 96/397, 417, 422
See application file for complete search history.

(56) References Cited

U.S. PATENT DOCUMENTS

| | | | |
|---|---|---|---|
| 3,338,049 A | 8/1967 | Fernberger | |
| 3,733,814 A | 5/1973 | Hull, Jr. et al. | |
| 3,979,903 A | 9/1976 | Hull, Jr. et al. | |
| 4,004,760 A | 1/1977 | Ando et al. | |
| 4,509,962 A | 4/1985 | Breitman et al. | |
| 4,527,387 A * | 7/1985 | Lastrina et al. | ............ 60/39.092 |
| 4,685,942 A | 8/1987 | Klassen et al. | |
| 4,860,534 A | 8/1989 | Easley et al. | |
| 4,928,480 A | 5/1990 | Oliver et al. | |
| 5,044,153 A | 9/1991 | Mouton | |
| 5,111,663 A | 5/1992 | Brandon | |
| 5,123,240 A | 6/1992 | Frost et al. | |
| 5,139,545 A * | 8/1992 | Mann | .............................. 55/306 |
| 5,279,109 A | 1/1994 | Liu et al. | |
| 6,134,874 A | 10/2000 | Stoten | |
| 6,499,285 B1 | 12/2002 | Snyder | |
| 6,508,052 B1 * | 1/2003 | Snyder et al. | ............... 60/39.092 |
| 6,702,873 B2 | 3/2004 | Hartman | |
| 7,678,165 B2 * | 3/2010 | Tingle et al. | ..................... 55/306 |
| 2003/0196548 A1 * | 10/2003 | Hartman | .............................. 95/8 |
| 2008/0156187 A1 * | 7/2008 | Tingle et al. | ...................... 95/22 |

* cited by examiner

*Primary Examiner* — Duane Smith
*Assistant Examiner* — Sonji Turner
(74) *Attorney, Agent, or Firm* — Ingrassia Fisher & Lorenz, P.C.

(57) ABSTRACT

An inertial inlet particle separator system for a vehicle engine includes an inertial inlet particle separator and an adjustment mechanism. The separator includes a fluid inlet coupled to a scavenge channel and to a clean channel such that a first amount of fluid passing through the fluid inlet enters the scavenge channel and a second amount of fluid passing through the fluid inlet enters the clean channel. The scavenge channel is defined by a first wall and a splitter, and the clean channel is defined by a second wall and the splitter. The splitter and the second wall are stationary with respect to each other. The adjustment mechanism is coupled to the inertial inlet particle separator and configured to adjust a size of the scavenge channel. Although not necessarily, the adjustment mechanism may also be coupled to the scavenge fan speed.

19 Claims, 2 Drawing Sheets

INLET PARTICLE SEPARATOR SYSTEMS AND METHODS

TECHNICAL FIELD

The present invention generally relates to a fluid inlet for a vehicle engine, and more particularly relates to a method and system for separating particles from an inlet fluid within an aeronautical vehicle engine.

BACKGROUND

During operation of an aeronautical vehicle, fluids such as air are pulled into an engine and are used to generate energy to propel the vehicle. The fluids may contain undesirable particles, such as sand and dust, which can degrade engine components. In order to prevent this occurrence, at least a portion of the undesirable particles are separated from the fluids using an inertial inlet particle separator.

A conventional inertial inlet particle separator typically includes a duct system with a fluid inlet that transitions into a scavenge channel that forms an in-line fluid path with the fluid inlet and a clean channel that branches off from the in-line fluid path. The inertia of particles in the fluid tend to make them travel in a straight line rather than follow the fluid flow path. This being the case, particles tend to flow straight into the scavenge channel rather than curve into the clean intake channel. As such, clean air is guided into the engine and separated from the contaminated air, which is guided from the scavenge channel into a blower where it is then discharged. Approximately, 15-25% of the fluid entering the fluid inlet typically enters the scavenge channel, while the remaining fluid and lighter particles enter the clean channel. The fluid entering the scavenge channel typically includes the larger particles such that only a small percentage of particles enter the engine through the clean channel, thereby protecting engine components.

Although some conventional inertial inlet particle separators are successful in providing relatively clean fluid to the engine, they may also have the adverse effect of increasing the pressure loss of the air entering the engine, with an attendant decrease in engine power output and increase in fuel consumption. Additionally, a typical conventional separator is unable to compensate for changing contamination conditions. For example, in particularly dirty or sandy environments, the separator is generally needed to provide clean fluid to the engine. However, in relatively clean environments, the scavenge system continues to pull scavenge air, even when it is not necessarily needed, which results in additional pressure loss, which may degrade engine performance. Conventional separators typically have a fixed geometry.

Accordingly, it is desirable to provide an improved method and system for separating particles from an inlet fluid for a vehicle engine. In addition, it is desirable to reduce pressure loss of the separator during at least some operating conditions. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with one exemplary embodiment, an inertial inlet particle separator system for a vehicle engine includes an inertial inlet particle separator and an adjustment mechanism. The separator includes a fluid inlet coupled to a scavenge channel and to a clean channel such that a first amount of fluid passing through the fluid inlet enters the scavenge channel and a second amount of fluid passing through the fluid inlet enters the clean channel. The scavenge channel is defined by a first wall and a splitter, and the clean channel is defined by a second wall and the splitter. The splitter and the second wall are stationary with respect to each other. The adjustment mechanism is coupled to the inertial inlet particle separator and configured to adjust a size of the scavenge channel.

In accordance with another exemplary embodiment, a method is provided for separating particles in an inertial inlet particle separator system. The method includes inducing a fluid into a fluid inlet; separating the fluid into a first amount entering a scavenge channel defined by a shroud and a stationary splitter and a second amount entering a clean channel defined by the stationary splitter and a stationary hub; measuring a contamination level of the fluid; and adjusting the scavenge channel based on the contamination level.

In accordance with yet another exemplary embodiment, an inertial inlet particle separator system for a vehicle engine includes an inertial inlet particle separator having a fluid inlet coupled to a scavenge channel and a clean channel such that a first amount of fluid entering the fluid inlet is directed into the scavenge channel and a second amount of fluid entering the fluid inlet is directed into the clean channel. The scavenge channel is defined by a shroud and a splitter, and the clean channel is defined by a hub and the splitter. The splitter and the hub are stationary with respect to each other. The system further includes an adjustment mechanism coupled to the inertial inlet particle separator for adjusting the second amount of fluid, the adjustment mechanism being configured to move the shroud relative to the splitter to narrow the scavenge channel. The system further includes a fan coupled to the scavenge channel for drawing the first amount of fluid through the scavenge channel; and a sensor coupled to the adjustment mechanism and measuring a contamination level of the fluid. The adjustment mechanism adjusts the first amount of fluid based on the contamination level.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Embodiments described herein provide inertial inlet particle separator systems and method for separating particles from an inlet fluid and for providing the clean fluid to an engine. Particularly, the separator system and method enable the adjustment of the scavenge channel to adjust the geometry of the inertial inlet particle separator. Changing the geometry of the scavenge shroud or splitter can enable a smooth surface for air to be directed into the engine and/or optimize the ability to direct particles into the scavenge channel.

Figure 1:
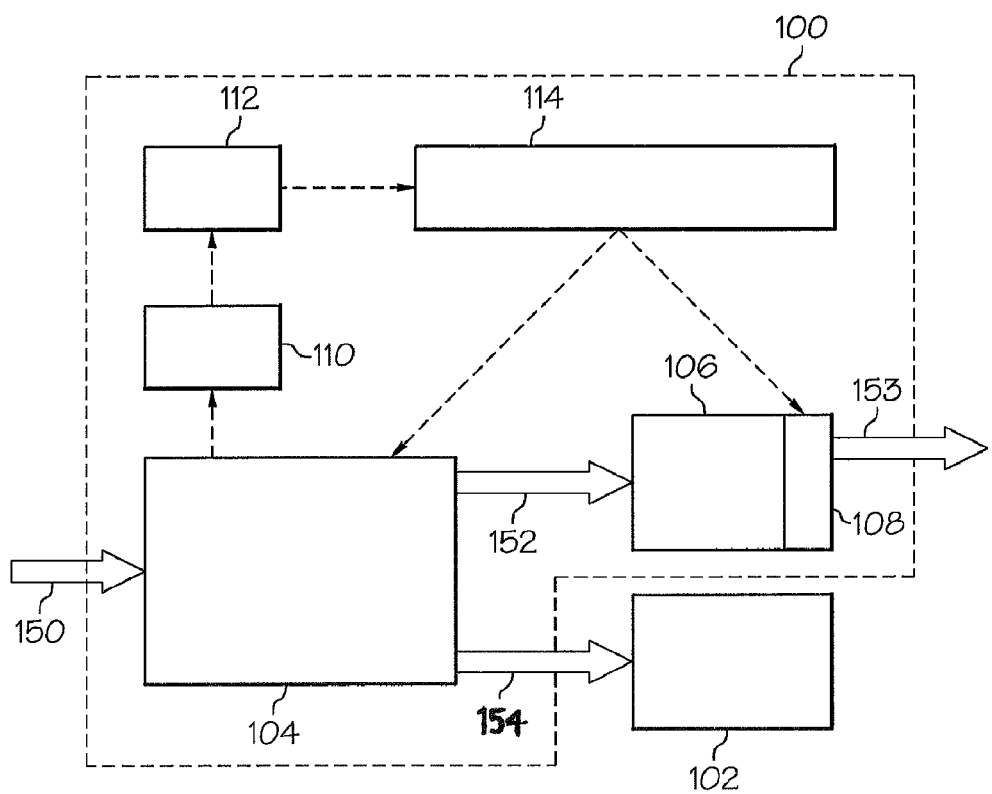
FIG. 1 is a block diagram of an inertial inlet particle separator system for supplying clean air to an engine in accordance with an exemplary embodiment.

FIG. 1 is an exemplary block diagram of an inertial inlet particle separator system 100 coupled to an engine 102. The engine 102 can be, for example, a turbine engine of an aeronautical vehicle such as a helicopter. The engine 102 compresses atmospheric air to elevate the air pressure, adds heat, and exhausts the compressed high pressure air through a series of turbines (not shown). The turbines extract work from the high pressure air, which in turn propels the vehicle.

Particularly, and as discussed in further detail below, the separator system 100 receives inlet air 150 and provides relatively clean, engine air 154 for use by the engine 102. The separator system 100 includes an inertial inlet particle separator 104 that receives the inlet air 150. The separator 104 separates the inlet air 150 into the engine air 154 provided to the engine 102 and the scavenge air 152. The scavenge air 152 is drawn into a scavenge scroll 106 by a fan 108 and then exhausted into the atmosphere as exhaust air 153. In one embodiment, the fan 108 is electric and not fixedly coupled to the engine 102.

Drawing scavenge air 152 in addition to engine air 154 through the inlet results in additional pressure loss to the engine 102. Pressure loss can contribute to degraded performance of the engine 102. Additional energy is also needed to power the fan when scavenge air is needed. The additional power requirement also degrades engine performance. Many conventional inertial inlet particle separators operate continuously, even in environments in which the level of contaminates in the inlet air is low, and thus the amount of scavenge air 152 needed is low. In fact, in some environments, the level of separation used to protect the engine components may be lower than normal, or even zero. As such, a more efficient operation of the separator system 100 can result in a more efficient operation of the engine 102 when conditions permit.

The separator system 100 further includes a sensor system 110 that measures a contamination level of particle concentration of the inlet air 150, engine air 154, and/or scavenge air 152. The sensor system 110 detects the contamination level in air flowing through the separator 104 using any appropriate technique. In various embodiments, the sensor system 110 may include a side optical device, a laser doppler velocimetry device, a laser two focus velocimetry device, a thermocouple, a "sand sniffer" in combination with a particle analyzer, an electrostatic particle sensor, a microphone, or other particle sensing devices known in the art.

The sensor system 110 is coupled to and provides the contamination level to a controller 112. The controller 112 may be microprocessor such as a computer having a central processing unit, memory (RAM and/or ROM), and associated input and output features. The controller 112 may be a portion of a central vehicle main control unit, an engine control unit, an interactive vehicle dynamics module, or a stand-alone controller. The controller 112 may also be simply solid-state digital or analog logic devices.

The controller 112 receives the contamination level from the sensor system 110 and determines whether an adjustment to the separator 104 is desirable. The controller 112 then sends the appropriate signal to the adjustment mechanism 114. The adjustment mechanism 114 can adjust the geometry of the separator 104, and thus, the amount of particles that flow into the scavenge scroll 106. The mechanisms for adjusting the separator 104, which can be used in combination or individually, are described in further detail below with reference to FIGS. 2-4.

Adjustment of the amount of particles that enter the scavenge scroll 106 enables a more efficient operation of the separator system 100 and engine 102. Particularly, the reduction of the amount of scavenge air 152 in relatively clean environments can reduce pressure loss and therefore improve the performance of the engine 102.

Figure 2:
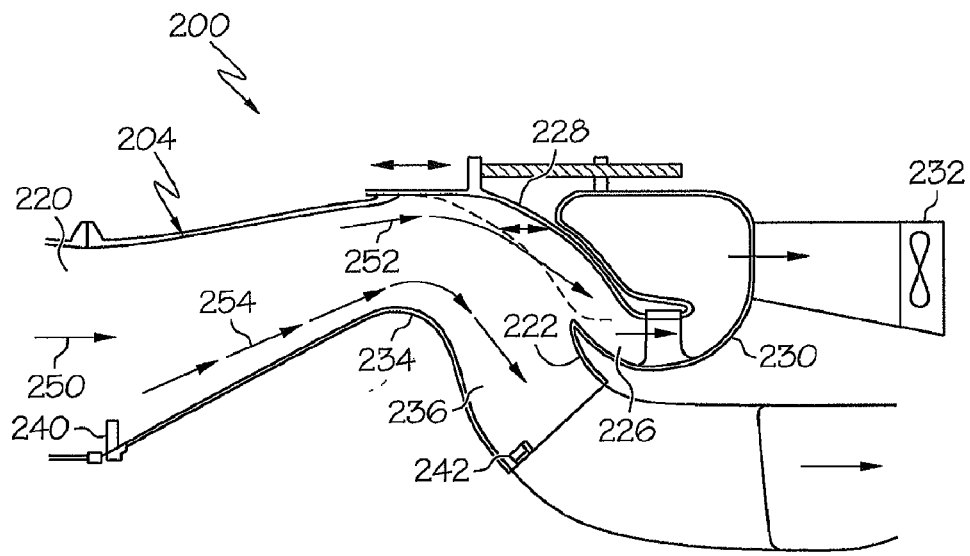
FIG. 2 is a partial cross-sectional view of a separator system in accordance with an exemplary embodiment.

FIG. 2 is a more detailed, cross-sectional view of portions of a separator system 200 that illustrates one way that a separator 204 can be adjusted to increase efficiency. The separator 204 includes an inlet 220 that receives inlet air 250. The inlet 220 transitions into a scavenge channel 226 defined by a splitter 222 and a shroud 228 and a clean channel 236 defined by the splitter 222 and a hub 234. The scavenge channel 226 is defined by a splitter 222 and a shroud 228, and a clean channel 236 is defined by the splitter 222 and a hub 234.

The inlet air 250 generally contains scavenge air 252 and engine air 254. Due to the inertia of the entrained particles, they tend to collect adjacent the shroud 228 and to enter the scavenge channel 226. The scavenge air 252 flows from the scavenge channel 226 into a scavenge scroll 230 and is ultimately exhausted into the atmosphere. The engine air 254 tends to follow the hub 234 and flow into the clean channel 236. The engine air 254 flows from the clean channel 236 into the engine (not shown in FIG. 2).

Decreasing the amount of scavenge air 252 decreases the inlet air pressure loss which in turn improves engine performance. In order to increase the efficiency of the separator 204, the separator system 200 can be adjusted, and can particularly be adjusted in a number of ways, which can be utilized in combination or individually. In one embodiment, an electric fan 232 is coupled to the scavenge scroll 230 to induce the scavenge air 252 into the scavenge channel 226 and the scavenge scroll 230. Increasing the speed of the fan 232 draws a greater amount of the inlet air 250 into channel 226, while decreasing the speed of the fan 232 draws a lesser amount of the inlet air 250 into channel 226. Accordingly, the fan 232 can be adjusted to induce more or less air into the scavenge channel 226. The fan 232 can also be turned off such that no scavenge air 252 is actively induced into the scavenge channel 226. Decreasing fan speed also requires less energy to drive the fan. Managing scavenge flow by controlling the fan speed minimizes energy used by fan 232.

In another embodiment, the geometry of the scavenge channel 226 can be adjusted to adjust the amount of particles entering the scavenge channel 226. In the depicted embodiment, the shroud 228 of the scavenge channel 226 can be translated or reoriented forward and back to open or close the scavenge channel 226. An open position of the shroud 228 is illustrated by the solid lines of FIG. 2, while a closed position of the shroud 228 is illustrated by the dashed lines. The shroud 228 can be adjusted into the open position, closed position, or any position in between. Adjusting the relative air paths between the scavenge channel 226 and the clean channel 236 impacts the flow of particles within the separator 204. This typically can occur in one of two ways. First, the directions of the paths can be changed such that the particles can or cannot enter the clean channel 236 due to inertia. Also, changes in geometry can cause a greater or fewer number of particles to rebound off surfaces into the clean channel 236. In particular embodiments, adjusting the shroud 228 can create a smooth surface for the engine air 254 entering the clean channel 236, which should reduce pressure loss in the system. Moreover, adjusting the shroud 228 enables the separator 204 to optimize the amount of particles that enter the scavenge channel 226. As discussed in greater detail below, other mechanisms can also be provided to adjust the scavenge channel 236 and optimize the separator 204.

The shroud 228 can be adjusted manually or by actuators such as an adjustment mechanism (e.g., adjustment mechanism 114 of FIG. 1). In one embodiment, the shroud 228 is adjusted by a screw or worm gear assembly and/or hydraulic or pneumatic pistons. In another embodiment, the shroud 228 can be biased such that its extent of opening is controlled by the speed of the fan 232. In other words, at high speeds, the fan 232 pulls the shroud 228 open, while at lower speeds, the shroud 228 at least partially or fully closes. In alternate embodiments, the paths of the scavenge air 252 entering the scavenge channel 226 and engine air 254 entering the clean channel 236 can be adjusted in other ways, such as for example, adjusting the geometry of the inlet 220, the clean channel 236, the hub 234, and/or the splitter 222. Generally, however, the splitter 222 and the hub 234 are stationary and the geometry of the clean channel 236 remains constant, although other embodiments could be configured in any manner.

A first sensor 240 and a second sensor 242 form part of a sensor system (e.g., sensor system 110 in FIG. 1) and assist the separator 204 in optimizing the relative amounts of scavenge air 252 and engine air 254. In one embodiment, the first sensor 240 measures the contamination level of the inlet air 250. The first sensor 240 can provide the contamination level to a controller (e.g., controller 112 of FIG. 1), which determines the appropriate adjustment of the fan 232 and/or shroud 228. The second sensor 242 measures the contamination level of the engine air 254. The second sensor 242 then provides the contamination level to the controller, which determines the appropriate adjustment of the fan 232 and/or shroud 228. In one embodiment, the measurement of the contamination level at the first sensor 240 dictates the adjustment of the fan 232 and the measurement of the contamination level at the second sensor 242 dictates the adjustment of the shroud 228. In another embodiment, one or both of the sensors 240, 242 can be omitted, or additional sensors can be provided.

Figure 3:
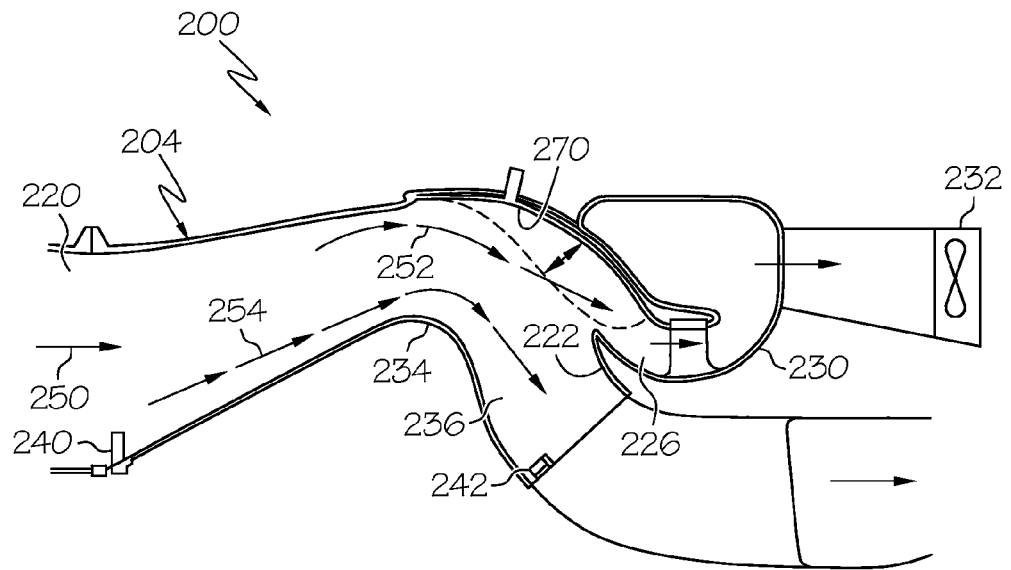
FIG. 3 is a partial cross-sectional view of a separator system in accordance with another exemplary embodiment.
Figure 4:
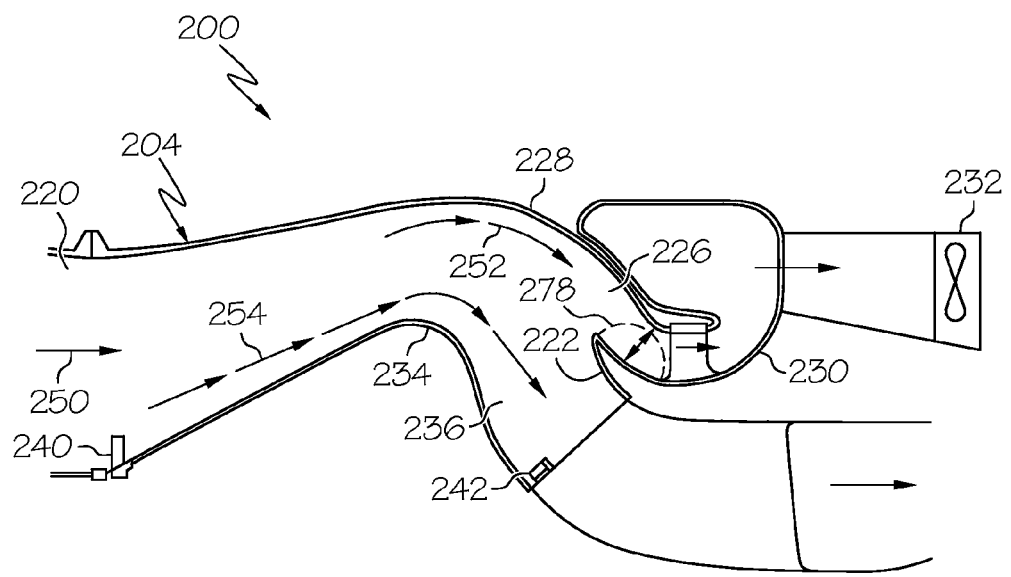
FIG. 4 is a partial cross-sectional view of a separator system in accordance with yet another exemplary embodiment.

FIGS. 3 and 4 depict alternate ways to adjust the geometry of the scavenge channel 226. In the cross-sectional view of FIG. 3, an inflatable boot 270 is provided on the shroud 228 to open or close the scavenge channel 226 based on the extent the boot 270 inflates. An open position of the inflatable boot 270 is illustrated by the solid lines, while a closed position of the inflatable boot 270 is illustrated by the dashed lines. The inflatable boot 270 can be adjusted into the open position, closed position, or any position in between. The inflatable boot 270 can be adjusted manually or by actuators such as the adjustment mechanism 114 (FIG. 1). In one embodiment, the inflatable boot 270 is adjusted by inflating with high pressure engine bleed air.

In the cross-sectional view of FIG. 4, an inflatable boot 278 is provided on the splitter 222 to open or close the scavenge channel 226 based on the extent the boot 278 inflates. An open position of the inflatable boot 278 is illustrated by the solid lines, while a closed position of the inflatable boot 278 is illustrated by the dashed lines. The inflatable boot 278 can be adjusted into the open position, closed position, or any position in between. The inflatable boot 278 can be adjusted manually or by actuators such as the adjustment mechanism 114 (FIG. 1). In one embodiment, the inflatable boot 278 is adjusted by inflating with high pressure engine bleed air.

Although exemplary embodiments are described above with respect to an inertial inlet particle separator system operating in air and therefore separating contaminated air from clean air, the present invention may be applied to inertial particle separators operating in or utilizing other fluids. For example, a fluid may be in the form of a liquid rather than air, as may be used in ships, submarines, and/or other watercraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An inertial inlet particle separator system for a vehicle engine, comprising:
    an inertial inlet particle separator including a fluid inlet coupled to a scavenge channel and to a clean channel such that a first amount of fluid passing through the fluid inlet enters the scavenge channel and a second amount of fluid passing through the fluid inlet enters the clean channel, wherein the scavenge channel is defined by a first wall and a splitter, and the clean channel is defined by a second wall and the splitter, and wherein the splitter and the second wall are stationary with respect to each other; and
    an adjustment mechanism coupled to the inertial inlet particle separator and configured to adjust a size of the scavenge channel, wherein the first wall is a shroud and the adjustment mechanism is configured to move the shroud relative to the splitter to thereby narrow the scavenge channel.

2. The system of claim 1, wherein the shroud has a first position in which the scavenge channel is open and a second position in which the scavenge channel is closed.

3. The system of claim 1, wherein the adjustment mechanism includes an inflatable boot that, when inflated, narrows the scavenge channel.

4. The system of claim 3, wherein the boot is positioned on the first wall.

5. The system of claim 3, wherein the boot is positioned on the splitter.

6. The system of claim 1, further comprising a fan coupled to the scavenge channel for drawing the first amount of fluid through the scavenge channel, wherein the adjustment mechanism is configured to adjust a speed of the fan such that the first amount of fluid entering the scavenge channel is adjusted.

7. The system of claim 6, wherein the fan actuates the shroud between a first position in which the scavenge channel is open and a second position in which the scavenge channel is closed.

8. The system of claim 6, wherein the fan is electric.

9. The system of claim 6, further comprising a sensor coupled to the adjustment mechanism and measuring a contamination level of the fluid, wherein the adjustment mechanism adjusts the fan speed based on the contamination level.

10. The system of claim 9, wherein the sensor is positioned in the fluid inlet.

11. The system of claim 1, further comprising a sensor positioned in the clean channel for measuring a contamination level of the second amount of fluid, wherein the adjustment mechanism adjusts the scavenge channel based on the contamination level.

12. An inertial inlet particle separator system for a vehicle engine, comprising:
   an inertial inlet particle separator including a fluid inlet coupled to a scavenge channel and to a clean channel such that a first amount of fluid passing through the fluid inlet enters the scavenge channel and a second amount of fluid passing through the fluid inlet enters the clean channel, wherein the scavenge channel is defined by a first wall and a splitter, and the clean channel is defined by a second wall and the splitter, and wherein the splitter and the second wall are stationary with respect to each other; and
   an adjustment mechanism coupled to the inertial inlet particle separator and configured to adjust a size of the scavenge channel, wherein the adjustment mechanism includes an inflatable boot that, when inflated, narrows the scavenge channel.

13. The system of claim 12, wherein the boot is positioned on the first wall.

14. The system of claim 12, wherein the boot is positioned on the splitter.

15. The system of claim 12, further comprising a fan coupled to the scavenge channel for drawing the first amount of fluid through the scavenge channel, wherein the adjustment mechanism is configured to adjust a speed of the fan such that the first amount of fluid entering the scavenge channel is adjusted.

16. The system of claim 15, wherein the fan actuates a shroud between a first position in which the scavenge channel is open and a second position in which the scavenge channel is closed.

17. The system of claim 15, further comprising a sensor coupled to the adjustment mechanism and measuring a contamination level of the fluid, wherein the adjustment mechanism adjusts the fan speed based on the contamination level.

18. An inertial inlet particle separator system for a vehicle engine, comprising:
   an inertial inlet particle separator including a fluid inlet coupled to a scavenge channel and to a clean channel such that a first amount of fluid passing through the fluid inlet enters the scavenge channel and a second amount of fluid passing through the fluid inlet enters the clean channel, wherein the scavenge channel is defined by a first wall and a splitter, and the clean channel is defined by a second wall and the splitter, and wherein the splitter and the second wall are stationary with respect to each other;
   an adjustment mechanism coupled to the inertial inlet particle separator and configured to adjust a size of the scavenge channel; and
   a fan coupled to the scavenge channel for drawing the first amount of fluid through the scavenge channel, wherein the adjustment mechanism is configured to adjust a speed of the fan such that the first amount of fluid entering the scavenge channel is adjusted.

19. The system of claim 18, further comprising a sensor positioned in the clean channel for measuring a contamination level of the second amount of fluid, wherein the adjustment mechanism adjusts the scavenge channel based on the contamination level.

\* \* \* \* \*